United States Patent [19]

Wieland et al.

[11] Patent Number: 5,062,743
[45] Date of Patent: Nov. 5, 1991

[54] DRILLING DEVICE

[75] Inventors: Dietrich Wieland; Martin Kalb, both of Wendelstein; Werner Grupp, Vaihingen; Michael Nothofer, Kornwestheim, all of Fed. Rep. of Germany

[73] Assignee: C. & E. Fein GmbH & Co., Fed. Rep. of Germany

[21] Appl. No.: 550,731

[22] Filed: Jul. 10, 1990

Related U.S. Application Data

[63] Continuation-in-part of Ser. No. 335,609, Apr. 10, 1989, abandoned.

[30] Foreign Application Priority Data

Jul. 9, 1990 [DE] Fed. Rep. of Germany ....... 9010313

[51] Int. Cl.$^5$ ........................ B23B 47/24; B23B 45/14
[52] U.S. Cl. .......................................... 408/6; 408/11; 408/14; 408/16; 408/76; 408/135
[58] Field of Search ................... 408/6, 10, 11, 14, 16, 408/76, 135

[56] References Cited

U.S. PATENT DOCUMENTS

| 3,008,155 | 11/1961 | Tsuda | 408/135 X |
| 3,456,738 | 7/1969 | Harry | 173/18 |
| 3,968,705 | 7/1976 | Amano et al. | 408/11 X |
| 3,989,405 | 11/1976 | Quackenbush | 408/11 |
| 4,604,006 | 8/1986 | Shoji et al. | 408/76 |

FOREIGN PATENT DOCUMENTS

| 0175643 | 3/1986 | European Pat. Off. . |
| 0236536 | 9/1987 | European Pat. Off. . |
| 561361 | 10/1932 | Fed. Rep. of Germany . |
| 703806 | 3/1941 | Fed. Rep. of Germany . |
| 1154993 | 9/1963 | Fed. Rep. of Germany . |
| 3009516 | 10/1980 | Fed. Rep. of Germany . |
| 3229306 | 5/1983 | Fed. Rep. of Germany . |
| 3100933 | 11/1985 | Fed. Rep. of Germany . |
| 463238 | 11/1968 | Switzerland . |

Primary Examiner—Steven C. Bishop
Attorney, Agent, or Firm—Barry R. Lipsitz

[57] ABSTRACT

In a drilling device, a holder is provided that is displaceable with respect to a foot in a feed direction. A drilling machine tool is carried by the holder. An electromotor provides a feed drive for driving the holder in the feed direction. The drilling machine tool and/or the holder are displaceable relative to the feed drive in an opposite direction to the feed direction by overcoming a counterforce. A switching element monitors the relative displacement and enables a signal to be derived for stopping the feed drive if a predetermined value of counterforce is exceeded. Motor current is limited to a predetermined maximum value during operation of the device.

25 Claims, 4 Drawing Sheets

DRILLING DEVICE

This application is a continuation-in-part of copending U.S. patent application Ser. No. 07/335,609 filed Apr. 10, 1989 now abandoned.

The invention relates to a drilling device comprising a holder for a drilling machine tool bearing a drilling tool, the holder being mounted for displacement and driven in a feed direction by means of a feed drive.

The drilling devices previously known comprise an electric feed motor which moves the displaceably mounted holder for the drilling machine tool, with this machine tool, in a feed direction. A disadvantage of this known drilling device is the fact that the feed drive is not automatically switched off when a drilling tool of the drilling machine tool strikes an obstruction or when the resistance of the workpiece to the tool is very large In these cases, it is impossible to avoid damage to the tip of the tool and sometimes subsequent damage to the workpiece itself.

German laid-open paper DE-OS 32 29 306 discloses a drilling device which switches off the feed drive once an overload state is attained. However, the overload state is determined by way of measuring the electrical motor load, i.e. the countertorque occurring at the motor. With such a method, the feed drive will not always be switched off in good time.

An object of the invention is to provide better protection for the drilling tool by performing the drilling process efficiently.

A further object of the invention is to improve the drilling device described at the outset such that the feed drive is always switched off in good time to protect the drilling tool as soon as the latter encounters too great a resistance.

Another object is to protect the drilling tool without always stopping the drilling process if the drilling device comes close to an overload state.

Yet another object is to provide a drilling device which is apt to react to different overload states in an optimized manner.

One object is accomplished according to the invention in a drilling device of the type described at the outset in that the drilling machine tool and/or the holder are connected with the feed drive such that the drilling machine tool and/or the holder are displaceable relative to the feed drive in opposite direction to the feed direction contrary to a counterforce, that a switching element is provided for monitoring said relative displacement, and that a signal is derived from said switching element for stopping the feed drive.

This device is based on the principle that the feed movement of the feed drive is compared with the feed movement of the drilling machine tool and/or the holder and that when the feed movements of these two parts of the drilling device differ the feed drive is stopped since a difference in the feed movement of drive and tool or holder can only mean that the drilling tool has encountered too great a resistance.

The inventive device may be used not only for ensuring that the tip of the drilling tool is not damaged when the drilling tool hits an obstruction but also for achieving defined drilling depths when a stop for the drilling machine tool is mounted on the drilling device. The drilling tool then encounters the resistance of the stop after a predeterminable feed movement and after reaching the desired drilling depth, whereby the signal for stopping the feed drive is then generated by the switching element.

The inventive construction is particularly suitable for drilling devices having a fixing device for securing the stand in position relative to an object to be worked. This applies in particular for magnetic drilling devices in which the fixing device comprises a foot having a magnet or drilling devices which are secured in position by a suction foot.

In a preferred embodiment, the counterforce can be adjusted. This means that the threshold for triggering the stop signal can be adapted to the material to be worked and/or the tool used.

It is expedient, in particular for these drilling devices, to control the holding force of the fixing device during operation of the drilling machine tool and to reduce the feed velocity when the strength of the magnetic field or the vacuum in the suction foot abate or to stop the feed drive when the holding force of the fixing device decreases to too great an extent. In this way, the drilling device cannot become detached due to any excessive feeding power of the feed drive.

In preferred embodiments, the feed drive comprises a toothed rack displaceable by a drive pinion. In this case, the holder for the drilling machine tool is preferably mounted on the toothed rack for displacement in the feed direction. The holder can then shift relative to the toothed rack when the drilling tool encounters too great a resistance or when the drilling machine tool strikes against the set stop. The counterforce can in this case be generated, for example, by a clamping effect and the resulting friction of the toothed rack on the holder.

In order to attain a defined position of the toothed rack relative to the holder in this preferred construction, the toothed rack is fixed in a first end position relative to the holder by means of a resilient force generating means, in particular a spring or a set of cup springs. Movement of the toothed rack relative to the holder is then only possible contrary to the spring tension. This spring tension can, for example, be set so as to correspond to a force of approximately 70 kp.

It is expedient for the toothed rack to be simultaneously the activating member for the switching element and cause this element to change into its other switching state when it is moved from the first end position into a second end position relative to the holder. This results in a direct monitoring of the movement of the feed drive relative to the drilling machine tool. The feed drive preferably comprises an electromotor having a regulatable motor current which enables the feed movement to be adapted to the tool used and the material to be worked. At the same time, it enables the feed to be decreased when the holding power of the magnet is too low or the vacuum in the suction foot of the drilling device is reduced.

In a preferred embodiment, the motor current is limited in general to a maximum value so that an overloading of the motor can be precluded.

In preferred embodiments of the invention, a status display is provided for displaying the switching state of the switching element and, with it, the operating state of the magnet drilling device.

A large number of mechanical, optical, inductive, magnetic and other switching elements are suitable for use as the switching element which has not so far been defined in greater detail. The only requirement for these switching elements is their operating safety under the operating conditions of the drilling device. Apart from a short feed path, the switching element is therefore required to have a particularly good resistance to vibration.

Mechanical microswitches are mentioned here merely by way of example.

An adjustable stop limiting the movement of the drilling machine tool in feed direction is preferably provided for determining a drilling depth.

Another object is accomplished according to the invention by a drilling device comprising a foot, a holder displaceable with respect to said foot in a feed direction, a drilling tool drive carried by said holder, a drilling tool driven by said drilling tool drive, a feed drive comprising an electromotor for driving said holder in said feed direction, an overload control means comprising a sensor for detecting a counterforce acting on said drilling tool, and further comprising a measuring means for detecting a motor load of said drilling tool drive, said overload control means switching off said feed drive but keeping said drilling tool drive running if said counterforce exceeds a predetermined level and/or if said motor load reaches a predetermined load level.

The advantage of this inventive solution is to be seen in the fact that this is able to react in a differentiated manner to the most varied counterforces leading to overload states by switching off the feed drive but still allow the drilling tool drive to continue running so that the drilling tool is given the chance to free itself.

The most varied possibilities are conceivable for the type of measurement of the counterforce acting on the drilling tool contrary to the feed direction. In principle, a force-measuring sensor may be provided at any point of connection between the drilling tool and the foot. It is, however, particularly favourable for the overload control means to comprise an actuating means for the sensor which allows movement of the drilling tool contrary to the feed direction. This type of design for the overload control means not only allows the force contrary to the feed direction to be measured in a relatively simple manner but also gives the drilling tool a certain mobility contrary to the feed direction in order to free itself once the feed drive has been stopped.

In the simplest case, the actuating means is constructed such that it comprises a displacement guide means and a displacement element movable relative thereto so that the actuating means can be located at any point of connection between the drilling tool and the foot, whereby the direction of displacement preferably comprises a component parallel to the feed direction.

It is particularly favourable for the displacement guide means to be a longitudinal guide and the displacement element to be a sliding element movable along this guide. This longitudinal guide ensures exact guidance and limits any deflected movement of the drilling tool to a defined direction, preferably a direction parallel to the feed direction.

In order to give the drilling tool the required mobility for deflected movement, but always maintain a force in the feed direction, the actuating means counteracts this movement of the drilling tool contrary to the feed direction by a resilient force generating means.

In this respect it is particularly favourable for the resilient force generating means to be adjustable in order to set a predetermined counterforce since it is then possible to adjust the counterforce according to the drilling task to be carried out.

In addition, it is expedient for the resilient force generating means to be pretensionable so that the paths of displacement need not be too long.

It is particularly advantageous to have a solution, in which the resilient force generating means allows a force exerting path of displacement of the actuating means. This can provide the possibility, once the feed drive is stopped, for the drilling tool to work itself free, the drilling tool still being subject to the force set at the force generating means.

No details have so far been given regarding the sensor. It is expedient for the sensor to be a path sensor which detects a path of displacement of the actuating means.

In this respect, it is especially appropriate for the sensor to be a multistage sensor which can separately detect a plurality of paths of displacement of different lengths.

In the simplest case, the sensor has a first switching stage and a second switching stage arranged successively thereto so that three positions can be detected by the sensor altogether, namely a first position in which both switching stages are activated, a second in which the first switching stage is not activated but the second switching stage is, and a third position in which both switching stages are inactive.

In a particularly expedient embodiment, the overload control means generates a warning signal when the first switching stage is reached. This warning signal provides the possibility of drawing an operator's attention to the fact that the counterforce acting on the drilling tool contrary to the feed direction is close to the predetermined counterforce and therefore the feed drive will be switched off if this counterforce increases.

This warning signal can be given in a number of different ways. For example, it is possible for the warning signal to be an optical signal. It is, however, also conceivable for the warning signal to be an acoustic signal.

In addition, in a preferred embodiment the overload control means switches off the feed drive when the second switching stage is reached. The resilient force generating means is then adjusted such that the predetermined counterforce is exceeded when the second switching stage is reached.

In the embodiment described thus far, no details have been given concerning the type of design used for the measuring means for detecting the motor load of the drilling tool drive.

This measurement, which represents a measurement of the countertorque acting on the drilling tool, may also be taken in a number of different ways. For example, it would be possible to detect the countertorque exerted by the drilling tool drive on the holder by means of force sensors. It is, however, particularly simple for the measuring means for detecting the motor load of the drilling tool drive to detect its current intake since, in this case, a parameter which is immediately relevant to damage to the drilling tool drive is measured directly.

It is, in this respect, expedient, when a first predetermined current limit is exceeded, for the overload control means to evaluate this as a maximum load level and switch off the feed drive. However, the drilling tool drive, in particular, continues to operate, despite the feed drive being switched off, so that the drilling tool can work itself free again.

In order to avoid the drilling tool drive constantly taking in more current and, finally, being damaged when it continues to operate, the overload control means comprises a current regulating means for the drilling tool drive and limits its current to a second value exceeding the first current limit by way of this current regulating means. In this way, the second current limit is established as a reliable maximum value for the drilling tool drive which may not be exceeded. In contrast to the solutions known from the state of the art, the drilling tool drive is not stopped as well when the absolute maximum value is reached. It is the current which is merely limited so that the drilling tool again has the possibility of working itself free without any damage to the drilling tool drive being possible.

In order to warn the user as soon as the first current limit is reached, the overload control means generates a warning signal when the first current limit is exceeded.

The warning signal can again be an acoustic or an optical warning signal, an optical signal being preferred.

In principle, it would be possible with the inventive drilling device to design the switching off process such that the feed drive is switched off once the predetermined counterforce or maximum motor load is exceeded and this cannot be cancelled until the operator switches the drive on again manually.

This is necessary in all those drilling devices in which a differentiated detection of all overload states cannot be carried out. In the inventive solution it is, however, advantageous for the switching off of the feed drive to be automatically cancelled and the feed drive switched on again once the counterforce or the motor load fall below their predetermined levels. The inventive drilling device thus offers the possibility of continuing operation without the need for an operator to intervene once the overload state has been eliminated. This is possible without the risk of parts of the drilling device being damaged since both the counterforce and the countertorque are detected in a differentiated manner.

Furthermore, it is particularly advantageous for the resilient force generating means to be adjusted such that the predetermined counterforce is not exceeded until this force generating means has moved along part of its displacement path. The displacement path of the resilient force generating means can then be used to allow the drilling tool to continue operating, once the feed drive has been switched off, as it is subject to the force of the force generating means until such time as the counterforce again falls below its predetermined level and feed from the feed drive is renewed.

This creates the possibility for operation of the drilling tool to be constantly continued since it is subject to the force exerted by the force generating means even with constant switching on and off of the feed drive and for drilling to be carried out due to stepwise movement of the holder by the feed drive in feed direction and continuous working along the displacement path.

In order to provide a defined adjustment of the drilling depth as well, it is advantageous for the feed means to be provided with a drilling depth control means which switches off the feed drive when a predetermined drilling depth is reached.

In this respect, it is particularly expedient for the drilling depth control means to be arranged separately to the actuating means so that the drilling depth can be controlled independently of the actuating means.

It is also expedient for the drilling depth control means to be arranged on the feed drive.

These and other advantages of the invention will be explained in more detail in the following on the basis of the drawings, in which

Figure 1:
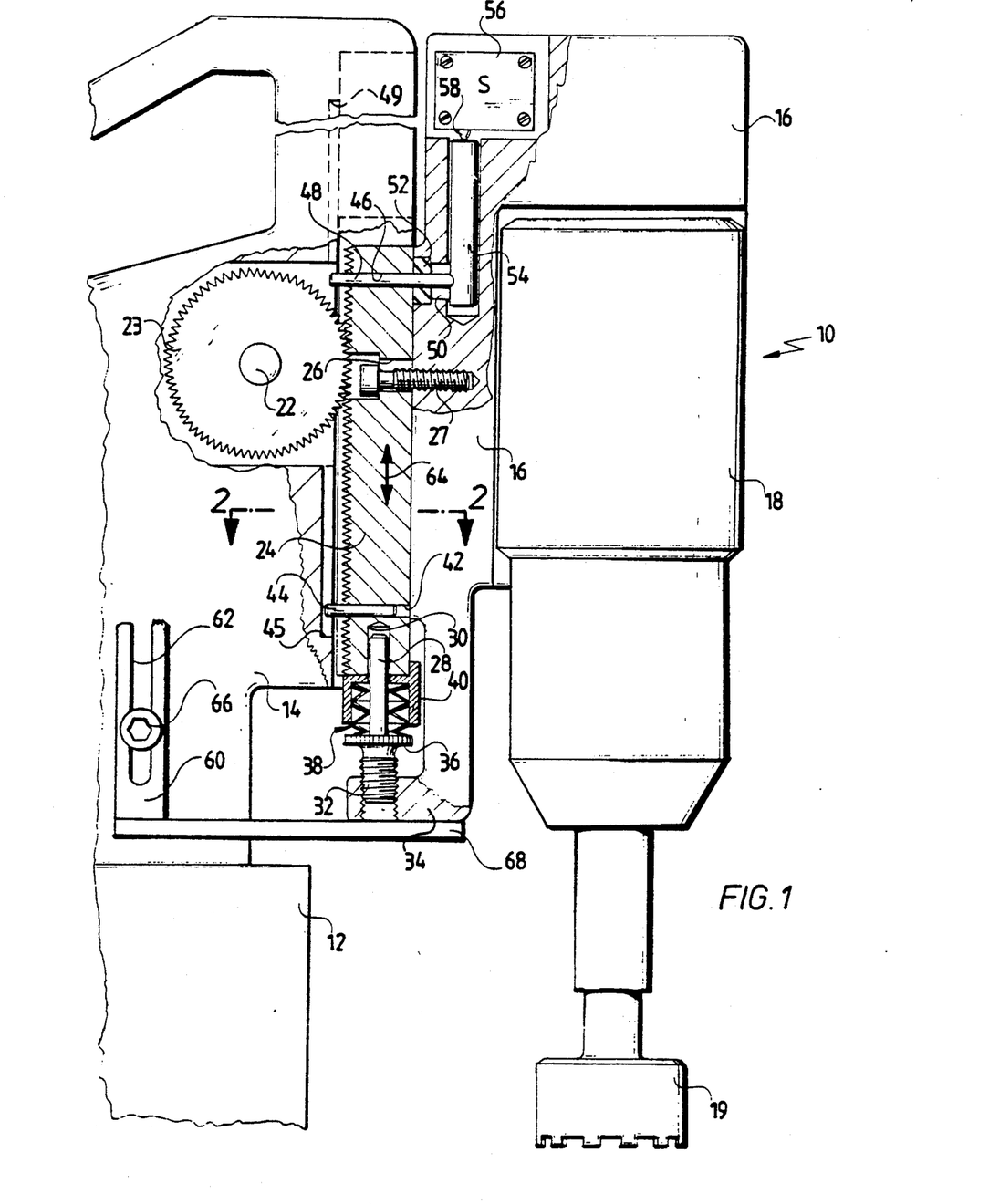
FIG. 1 is a part-sectional, schematic view of a first embodiment of an inventive drilling device.
Figure 2:
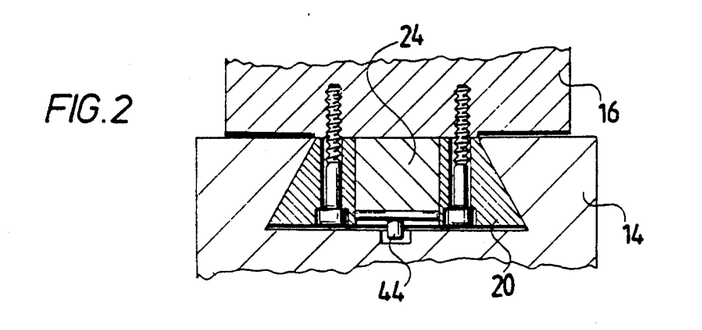
FIG. 2 is a sectional view along line 2—2 in FIG. 1.
Figure 3:
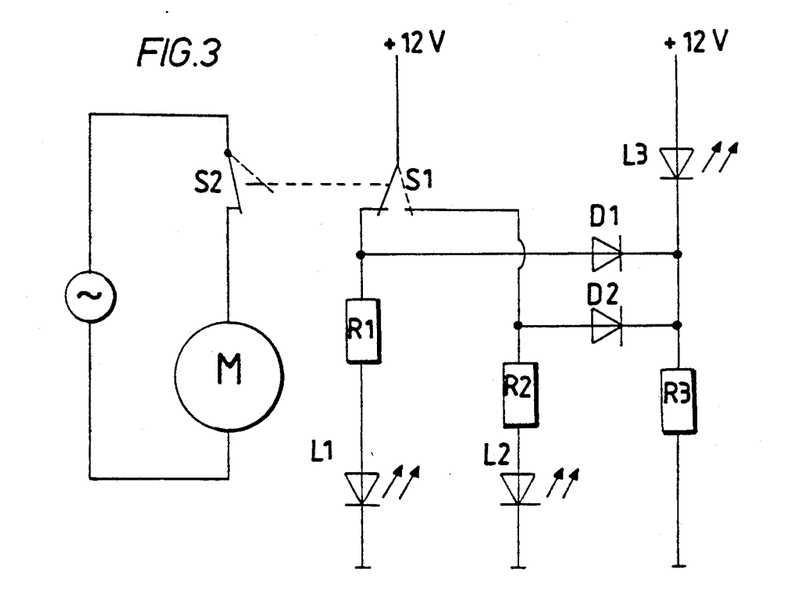
FIG. 3 is a block diagram for a switching state display for the feed drive of the drilling device.

FIGS. 1 to 3 show a first embodiment of the inventive drilling device.

FIG. 1 shows a drilling device designated as a whole by the reference numeral 10. This device is secured in position by a magnetic foot 12 to an object which is not shown.

A guide means 14 for the drilling device 10 is mounted on the magnetic foot 12 and mounts a holder 16 for a drilling machine tool 18 via a dovetail guide means 20. A drilling tool having a core bit 19 is mounted in the drilling machine tool 18 shown in FIG. 1.

The guide means 14 also mounts a drive shaft 22 having a drive pinion 23 non-rotatably mounted thereon. The drive shaft 22 is driven by a motor M not illustrated in FIG. 1 via a gearing also not illustrated in FIG. 1 and operates via the drive pinion 23 on a toothed rack 24 which is held on the holder 16 such that it can shift relative to the holder 16.

This is achieved in that the toothed rack 24 has on the one hand an elongated hole 26 through which a screw 27 passes. This screw is screwed into the holder 16. At its lower end the toothed rack 24 is held by a guide bolt 28 which engages with one end in a corresponding blind hole 30 in the toothed rack 24. At its other end the guide bolt 28 has an external thread 32 which is screwed into a support flange 34 of the holder 16. A knurled wheel 36 is formed on the guide bolt 28 adjacent the external thread 32 in the longitudinal direction and enables the guide bolt 28 to be turned into the flange 34 to a greater or lesser extent. The knurled wheel 36 serves at the same time to support a set of cup springs 38 which is pushed onto the guide bolt 28 from its end which engages in the blind hole 30. A guide sleeve 40 is pushed onto the guide bolt 28 between the set of cup springs 38 and the toothed rack 24 and engages over a portion of this set of cup springs 38.

At the lower end of the toothed rack 24 a stop pin 44 is inserted into a bore 42. This pin protrudes with one end beyond the teeth of the toothed rack 24 and, together with a stop face 45 arranged on the guide means 14, defines a downward limit for the displacement path of the holder 16 relative to the guide means 14.

At the upper end of the toothed rack an additional bore 46 is provided, into which an upper stop pin 48 is inserted. This pin also protrudes with one end beyond the teeth of the toothed rack 24 and, together with a stop face 49 arranged on the guide means 14, defines an upward limit for the displacement movement of the holder 16 relative to the guide means 14 and therefore determines the highest point which can be reached with the drilling machine tool 18.

Instead of the stop faces 45 and 49 it would also be possible to provide a limit for the displacement movement of the holder 16 by having the stop pins 44 and 48 strike against the drive pinion 23.

With its opposite end the upper stop pin 48 protrudes backwards out of the toothed rack 24 and into a cavity 50 in the holder 16. This cavity 50 is sealed relative to the toothed rack 24 by a seal 52, through which the stop pin 48 passes. The upper stop pin bears a bolt 54 in a bore extending parallel to the toothed rack 24 and one end of this bolt can be brought into contact with an activating element 58 of a switch 56.

The cavity 50 is designed such that it essentially consists of two bores extending at right angles to one another, one bore enabling the stop pin 48 to exit from the toothed rack 24 and the other bore essentially accommodating and guiding the bolt 54.

In the normal operating state, the toothed rack takes up the position relative to the holder 16 which is shown in FIG. 1. In this case, the set of cup springs 38 which is supported on the knurled wheel 36 of the guide bolt 28 pushes the toothed rack 24 upwards such that the screw 27 rests against the lower end of the elongated hole 26.

During a further downward movement, during which either the drilling tool head 19 encounters too great a resistance or the drilling machine tool 18 strikes against a stop (which is not illustrated), the toothed rack 24 moves downwards relative to the holder 16 until the screw 27 comes to rest against the upper end of the elongated hole 26. At the same time the upper stop pin 48 moves downwards in the cavity 50, whereby the material in the lower portion of the seal 52 is compressed. The bolt 54 which is borne by the upper stop pin 48 moves downwards at the same time within the perpendicular bore of the cavity 50 and releases the activating element 58 of the switch 56. This leads to a change in the switching state of the switch 56 and, simultaneously, to the feed drive and the drive pinion 23 being stopped.

If the holder 16 is lowered with the toothed rack 24 to such an extent that the stop face 45 comes into contact with the lower stop pin 44, the maximum motor current is limited by a motor current regulating means to 5 amperes so that the motor will not become overheated.

In order to determine a maximum drilling depth, a bar 60 having an elongated hole 62 is mounted on the guide means 14 so as to be displaceable in the direction of feed 64 and may be secured in position by at least one screw 66. This bar 60 has a stop finger 68 which extends in the direction of the support flange 34 and such that the support flange 34 abuts against this finger when the maximum drilling depth is reached and further movement of the support flange 34 in the feed direction is no longer possible.

FIG. 2 shows a sectional view of the dovetail guide means 20 which is attached to the holder 16 by screw connections and engages in a complementary recess in the guide means 14 and is displaceably held therein.

FIG. 3 shows an example of a circuit diagram for a status display. This status display operates with a direct voltage of 12 volts with which three different light diodes are controlled via series resistors R1, R2 and R3 according to the switching state. In the normal operating state, the switch position of which is shown in FIG. 3, the voltage source is connected with the green light diode L1 via the switch S1 and the resistor R1. At the same time, the 12-volt level is applied to the outlet side of light diode L3 via the switch S1 and the diode D1.

This means that there is no voltage drop at the diode L3 and this light diode will consequently not light up. When the switching state of the switch S1 changes, contact to the left-hand branch with the resistor R1 and the light diode L1 is first of all interrupted. During this time, a drop in voltage occurs at the diode L3 and this lights up yellow. As soon as the second defined switching position of the switch S1 is attained, in which the voltage source is connected with the light diode L2 via the resistor R2, 12 volts are again applied (this time via the diode D2) to the outlet side of the light diode L3. A voltage drop will therefore no longer occur at this diode and the diode L3 will be extinguished. At the same time, current flows through the resistor R2 and the light diode L2 and so this diode will light up. This switch position corresponds to the switched-off state of the feed motor which is illustrated in the block diagram of FIG. 3 as M. Any change in the switch position of the switch S1 corresponds to an interruption in the electrical connection to the power-supply voltage via the switch S2 which supplies the motor with alternating current when the diode L1 shows green and, on the other hand, interrupts its supply of current when the light diode L2 shows red.

The feed is regulated as a result of a regulation of the motor current, as described in the following:

Depending on the drilling machine tool used and the material to be worked, the feed velocity which is maintained by the feed drive is adjusted until the motor current input reaches the predetermined maximum value of, for example, 5 amperes. Any additional increase in the motor current would lead to an overload of the motor and is avoided if at all possible. For this reason, the feed is now regulated in response to the motor current, whereby the nominal current of 5 amperes is taken as the standard parameter.

The holding force of the magnetic foot 12 of the drilling device 10 can be constantly monitored by measuring probes and incorporated into the feed regulation as a limiting parameter. If the holding force of the magnet (or, for example, a suction foot) is too low for a specific feed velocity, the feed will be reduced in a manner analogous to the above example. If pressure peaks occur due to a greater resistance of the workpiece to the tool or due to incorrect operation of the device, the toothed rack which transfers the feed can shift contrary to the force of the set of cup springs 38, whereby the microswitch 56 which switches off the feed is activated at the same time.

Figure 4:
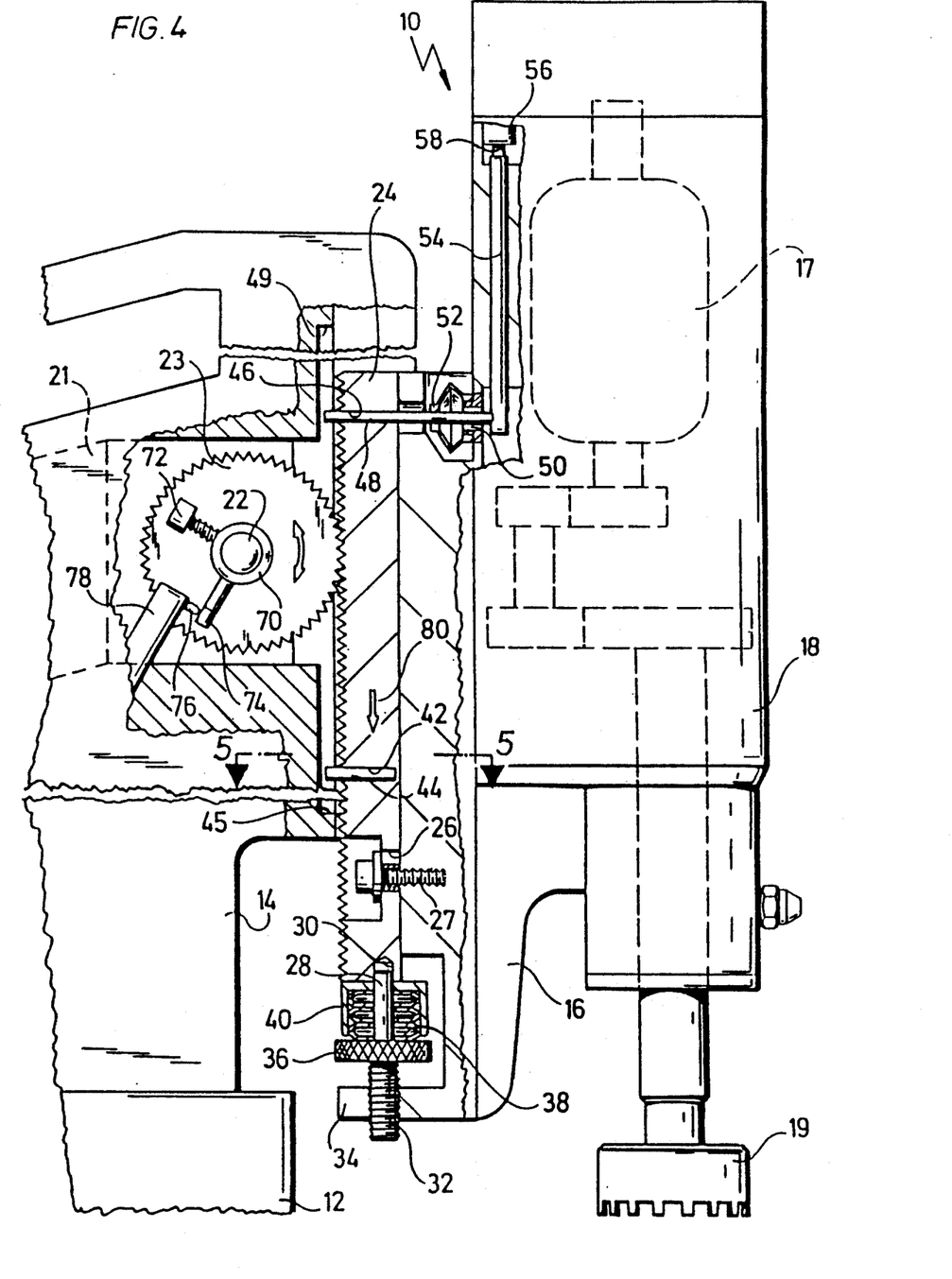
FIG. 4 is a part-sectional, schematic view of a second embodiment of the inventive drilling device.
Figure 5:
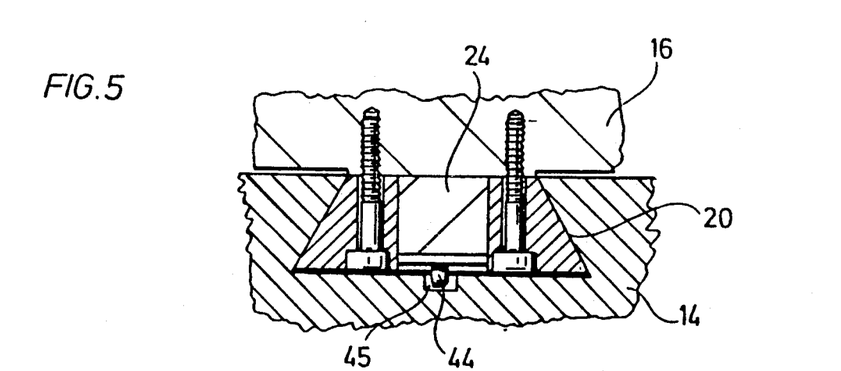
FIG. 5 is a sectional view along line 5—5 in FIG. 4.
Figure 6:
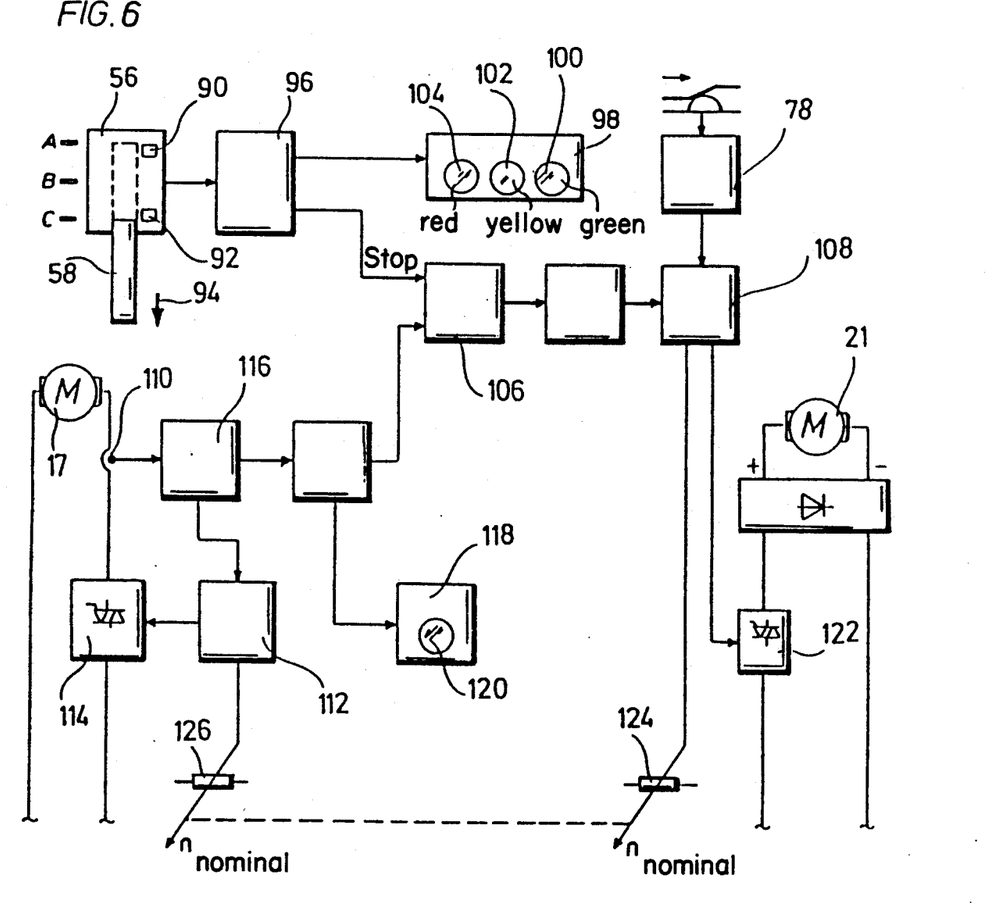
FIG. 6 is a block diagram of one embodiment of an overload control means.

In a second embodiment of the invention shown in FIGS. 4 to 6 the same parts are given the same reference numerals and therefore reference is made to the description of these parts according to the first embodiment.

To establish a maximum drilling depth for the drilling means, a tension ring 70 is provided on the drive shaft 22 and this ring is rotatable relative to the shaft 22 and able to be fixed non-rotatably in various positions by means of a setscrew 72. This tension ring bears a stop cam 74 which, in the position shown in FIG. 3, acts on an activating element 76 of a drilling depth control means 78 such that the drilling depth control means, as will be described in detail, switches off the feed drive 21.

The inventive drilling depth control means operates on the principle that the drive pinion 23 is normally designed such that less than one rotation effects the maximum feed path in the feed direction 80 and so a maximum of not quite one rotation of the drive pinion 23 effects the maximum feed path. This means that in the position of the holder 16 when this is moved to the top the stop cam 74 can be located on the side of the drilling depth control means 78 opposite the activating element 76. If a smaller drilling depth is desired the tension ring is rotated on the drive shaft 22 to such an extent, and then fixed in position, that the activating element 76 of the drilling depth control means 78 is already activated after a shorter feed path.

The control mechanism for the inventive drilling means comprises, as illustrated in the block diagram of FIG. 6, the switch 56 which includes two switching contacts 90 and 92 which are activatable one after the other depending on movement of the activating element 58 in the displacement direction 94 such that the switch 56 is able to ascertain and signal to an evaluating means 96 three different displacement positions of the holder 16 relative to the toothed rack 24.

The activating element 58 is in the first position A when the force exerted by the core bit 19, serving as drilling tool, on the holder contrary to the feed direction 80 is so slight that no movement of the holder 16 relative to the toothed rack results and, with it, no deflected movement of the holder 16 contrary to the feed direction 80.

However, if the counterforce exerted by the core bit 19 on the holder increases when the drive pinion 23 is rotated further and the holder 16 is therefore moved further in the feed direction 80 such that the set of cup springs 38 is pressed together, the holder 16 is first moved slightly relative to the toothed rack 24 contrary to the feed direction 80. This results in the activating element 58 being withdrawn from the switch 56 in the displacement direction 94, i.e. in the feed direction 80, and the second position B is reached. In this position B, the first switching contact 90 is no longer activated but the switching contact 92 remains activated. This position B is deemed to be a state of drilling force which is just allowable.

If the counterforce exerted by the core bit 19 on the holder 16 increases still further, this will cause the set of cup springs 38 to be pressed together even more contrary to the feed direction 80 and also cause the activating element 58 to move further in the feed direction 80 such that the second switching contact 92 is also no longer activated and the activating element 58 reaches the third position C. The position C is deemed to be the extent of drilling force which is no longer acceptable.

In order to be able to adjust the occurrence of position C according to the respective conditions, the pretensioning of the set of cup springs 38 may be adjusted by the knurled wheel 36 and the thread 32.

All the positions A, B and C of the activating element 58 are transmitted from the switch 56 to the evaluating circuit 96 which also controls a display unit 98 having a total of three light diodes 100, 102 and 104. The light diode 100 is green and indicates position A, the light diode 102 is yellow and indicates position B and the light diode 104 is red and indicates position C.

With these light diodes 100 to 104 a person operating the inventive drilling device can recognize in what state the inventive drilling device is operating, in particular what counterforce is exerted by the core bit 19 on the holder 16.

In addition, the evaluating circuit 96 transmits a stop signal to a non-exclusive OR-member 106 which controls a feed control means 108, as will be described later.

Furthermore, the inventive overload control means comprises a current sensor 110 which constantly measures the current required by the drilling tool drive 17. This current is controlled via a drilling regulator 112 acting on a triac 114 in the current circuit of the drilling tool drive 17.

The drilling regulator 112 is, for its part, controlled by a current evaluating circuit 116 connected with the current sensor 110.

The current evaluating circuit 116 operates such that it sends a stop signal to the OR-member 106 once a first current limit flowing through the drilling tool drive 21 is exceeded and at the same time the current evaluating circuit controls a current indicator 118 comprising a light diode 120 which informs the operator of the inventive drilling device that he is now operating above the first current limit.

In addition, the current evaluating circuit 116 also detects a second current limit which exceeds the first current limit and once this second limit is reached restricts the current to this second current limit via the drilling regulator 112 and the triac 114 so that a reduction in the rotational speed of the drilling tool drive may occur.

The OR-member 106 combines the two stop signals and already actuates the feed regulator 108 when one of the stop signals occurs so that the regulator interrupts the supply of current to the feed drive 21 via a triac 122 and thereby prevents any further load. The OR-member 106 is operated, in particular, as a non-exclusive OR-member so that the feed drive 21 is switched off when a stop signal is transmitted from either the evaluating circuit 96 or from the current evaluating circuit 116 or when both stop signals occur.

Moreover, the drilling depth control means 78 also acts on the feed regulator 108 and, when its activating element 76 is actuated, this also results in the current to the feed drive 21 being switched off.

Both the feed regulator 108 and the drilling regulator 112 are each provided with a nominal adjusting member 124 and 126, respectively, so that a desired feed velocity can be adjusted with the nominal adjusting member 124 via the feed regulator 108 and a predetermined nominal rotational speed for the drilling tool drive 17 with the nominal adjusting member 126.

In accordance with the invention, the two nominal adjusting members 124 and 126 are coupled with one another in a predetermined relationship, whereby the coupling depends on the type of drilling tool drive 17 and the type of feed drive 21 used as well as the material to be worked. The coupling of the two nominal adjusting members 124 and 126 provides the possibility of predetermining the most advantageous ratio between the feed velocity and the rotational speed of the drilling tool so that the operator merely needs to make an adjustment in order to define both the desired feed velocity as well as the desired rotational speed of the drilling tool 19.

The feed regulator 108 then operates with the value of the feed velocity preselected at the nominal adjusting member 124 when an interruption of the feed drive 21 is not required by either the OR-member 106 or the drilling depth control means 78. In the same way, the drilling regulator 112 then sets the rotational speed of the drilling tool drive 17 selected at the nominal adjusting member 126 when the current evaluating circuit 116 does not require any limitation to the second current level in the current circuit of the drilling tool drive 17.

With the overload control means the inventive drilling device operates such that first of all the drilling process is carried out with the values for the feed velocity and the rotational speed of the drilling tool 19 preselected at the nominal adjusting members 124 and 126.

If too large a counterforce is exerted on the drilling tool 19 contrary to the feed direction 80, due to too high a feed velocity, the activating element 58 of the switch 56 is first of all moved from the position A into the position B. This results in the evaluating circuit 96 no longer indicating the normal state via the green light diode 100 but indicating via the yellow light diode 102 that the drilling force is now at a level which is just acceptable. If the counterforce exerted on the drilling tool 19 contrary to the feed direction 80 increases still further, the activating element 58 will be moved into the position C. This results in the evaluating circuit 96 indicating, on the one hand, via the red light diode 104 that the drilling force now reached is no longer acceptable and, on the other, transmitting a stop signal to the OR-member 106 which stops the feed drive 21 via the feed regulator.

In this case, as already explained in the description of the mechanical construction, the set of cup springs 38 is pressed together for a certain distance and urges the holder 16 and, finally, the drilling tool 19 towards the object to be drilled when the feed drive 21 and, with it, the toothed rack 24 are stationary. When the feed drive 21 is switched off, the drilling tool drive 17 has the possibility of continuing operation and working the drilling tool free due to the force exerted by the set of cup springs 38. Only when the counterforce contrary to the feed direction 80 abates and the tension in the set of cup springs 38 is released and therefore the activating element 58 of the switch 56 returns to the position B, will the evaluating circuit 96 cancel the stop signal transmitted to the OR-member and switch the feed drive on again so that operations can continue at the original feed velocity.

This type of control allows operation of the inventive drilling device such that in the case of material which is difficult to drill the drilling device is constantly operated in the region of the maximum allowed drilling force. In this respect, the feed drive 21 is switched off when the drilling force is exceeded and switched on again when the drilling force falls below its limit so that the holder 16 is constantly being moved forward in steps while the drilling tool 19 is always subject to a force exerted by the set of cup springs 38 which fluctuates about the maximum drilling force value allowed.

Furthermore, the control of the drilling tool drive 17 operates such that when too great a torque occurs in the region of the drilling tool 19 and, with it, an excessive current intake of the drilling tool drive 17, the current sensor 100 will first of all establish that the first current limit is exceeded. This state is indicated by the light diode 120 of the current indicator 118 and, at the same time, a stop signal is transmitted to the OR-member 106 which also results in the feed drive 21 being switched off by the feed regulator 108. Once the feed drive is switched off, no further feed to the drilling tool 19 takes place and so the drilling tool drive has the possibility of continuing operations with the set current limit and to work the drilling tool free therewith until the countertorque and, consequently, the current intake of the drilling tool drive as well fall below the first current limit, whereupon the current evaluating circuit 116 cancels the stop signal and the feed drive 21 is then switched on again.

If the current continues to increase while the drilling tool is working itself free, the current evaluating circuit 116, as already described, will limit the current for the drilling tool drive 17 to the second current limit, once this limit is reached, via the drilling regulator 112.

The inventive overload control means therefore enables different overload states to be considered in a differentiated manner, namely, on the one hand, an overload state caused by too great a drilling force and a counterforce resulting therefrom contrary to the feed direction 80 and, on the other hand, an overload state caused by a countertorque on the drilling tool 19 and, with it, too much current supplied by the drilling tool drive 17. Both overload states can occur individually or together. The inventive overload control means will, in any case, give the drilling tool drive 17, by switching off the feed drive, the possibility of working the drilling tool 19 free again by continuing operation. Once the drilling tool 19 has been worked free the overload control means will automatically switch on the feed drive 21 again and thereby continue the drilling process. This allows an intermittent feed operation during drilling of materials below load limits. This type of operation will, in any state, avoid an overloading of the drilling device but is still in a position to carry out drilling operations constantly in the region of load limits.

What is claimed is:

1. A drilling device comprising
    a foot having a fixing device acting with a holding force on an object for fixing said foot on said object,
    a holder displaceable with respect to said foot in a feed direction,
    a drilling machine tool carried by said holder,
    a feed drive comprising an electromotor for driving said holder in said feed direction,
    a controlling means for controlling the feed velocity of the feed drive in response to said holding force of said fixing device.

2. Drilling device as defined in claim 1, characterized in that the fixing device comprises a foot having a magnet or a suction foot.

3. Drilling device as defined in claim 1, characterized in that a connecting means is provided for connecting said drilling machine tool and/or said holder with said feed drive such that said drilling machine tool and/or said holder are displaceable relative to said feed drive in an opposite direction to said feed direction by overcoming a counterforce, and that a controlling means is provided, said controlling means comprising a switching element for monitoring said relative displacement and for deriving a signal from said switching element for stopping said feed drive if a predetermined value of said counterforce is exceeded.

4. Drilling device as defined in claim 3, characterized in that a status display is provided for the switching state of the switching element.

5. Drilling device as defined in claim 1, characterized in that a controlling means is provided, said controlling means comprising a limiting means for limiting motor current to a predetermined maximum value.

6. A drilling device comprising
    a foot,
    a holder displaceable with respect to said foot in a feed direction,
    a drilling tool drive carried by said holder, a drilling tool driven by said drilling tool drive, a feed drive comprising an electromotor for driving said holder in said feed direction, an overload control means comprising a path sensor for detecting a counterforce acting on said drilling tool, and further comprising a measuring means for detecting a motor load of said drilling tool drive, said overload control means switching off said feed drive but keeping said drilling tool drive running if said counterforce exceeds a predetermined value and/or if said motor load reaches a predetermined load level.

7. Drilling device a defined in claim 6, characterized in that said overload control means comprises an actuating means for said sensor allowing deflected movement of said drilling tool contrary to said feed direction.

8. Drilling device as defined in claim 7, characterized in that said actuating means comprises a displacement guide means and a displacement element movable relative thereto.

9. Drilling device as defined in claim 8, characterized in that said displacement guide means is a longitudinal guide means and said displacement element is a sliding element movable along said guide means.

10. Drilling device as defined in claim 7, characterized in that said actuating means counteracts said deflected movement of said drilling tool contrary to said feed direction by way of a resilient force generating means.

11. Drilling device as defined in claim 10, characterized in that said resilient force generating means is adjustable to set a predeterminable counterforce.

12. Drilling device as defined in claim 10, characterized in that said resilient force generating means is adapted to be pretensioned.

13. Drilling device as defined in claim 10, characterized in that said resilient force generating means allows a force exerting path of displacement of said actuating means.

14. Drilling device as defined in claim 6, characterized in that said sensor is a multistage sensor.

15. Drilling device as defined in claim 14, characterized in that said sensor has a first switching stage and a second switching stage arranged successively thereto.

16. Drilling device as defined in claim 15, characterized in that said overload control means generates a warning signal when said first switching stage is reached.

17. Drilling device as defined in claim 16, characterized in that said overload control means switches off said feed drive when said second switching stage is reached.

18. Drilling device as defined in claim 6, characterized in that said measuring means for said motor load of said drilling tool drive detects its current intake.

19. Drilling device as defined in claim 18, characterized in that when a first predetermined current limit is exceeded said overload control means evaluates this as a maximum load level and switches off said feed drive.

20. Drilling device as defined in claim 19, characterized in that said overload control means comprises a current regulating means for said drilling tool drive and limits the current thereof to a second value exceeding said first current limit by way of said current regulating means.

21. Drilling device as defined in claim 19, characterized in that said overload control means generates a warning signal when said first current limit is exceeded.

22. Drilling device as defined in claim 6, characterized in that said switching off of said feed drive is automatically cancelled once said counterforce or said motor load fall below their predetermined levels and said feed drive is switched on again.

23. Drilling device as defined in claim 10, characterized in that said resilient force generating means are adjustable such that said predetermined counterforce is not exceeded until said means has moved along part of its displacement path.

24. Drilling device as defined in claim 6, characterized in that said feed means is provided with a drilling depth control means for switching off said feed drive when a predetermined drilling depth is reached.

25. Drilling device as defined in claim 24, characterized in that said drilling depth control means is arranged separately to said actuating means.

* * * * *

UNITED STATES PATENT AND TRADEMARK OFFICE
CERTIFICATE OF CORRECTION

PATENT NO.  :  5,062,743
DATED       :  November 5, 1991
INVENTOR(S) :  Wieland, et al.

It is certified that error appears in the above-identified patent and that said Letters Patent is hereby corrected as shown below:

On the title page of the patent, the text under the heading "Foreign Application Priority Data" should read:

-- April 15, 1988 [DE] Fed. Rep. of Germany .... 3812526

July 7, 1990  [DE] Fed. Rep. of Germany .... 9010313 -- .

Signed and Sealed this

Twenty-third Day of March, 1993

Attest:

STEPHEN G. KUNIN

*Attesting Officer*            Acting Commissioner of Patents and Trademarks